(12) United States Patent
Mayer

(10) Patent No.: US 11,275,457 B2
(45) Date of Patent: Mar. 15, 2022

(54) HEATED JOYSTICK

(71) Applicant: Nathan Jerome Mayer, Big Lake, MN (US)

(72) Inventor: Nathan Jerome Mayer, Big Lake, MN (US)

( * ) Notice: Subject to any disclaimer, the term of this patent is extended or adjusted under 35 U.S.C. 154(b) by 0 days.

(21) Appl. No.: 16/918,748

(22) Filed: Jul. 1, 2020

(65) Prior Publication Data
US 2021/0157417 A1 May 27, 2021

Related U.S. Application Data

(63) Continuation of application No. 16/216,869, filed on Dec. 11, 2018, now Pat. No. 10,747,341.

(60) Provisional application No. 62/597,402, filed on Dec. 11, 2017.

(51) Int. Cl.
G06F 3/038 (2013.01)
H05B 1/02 (2006.01)
A61G 5/10 (2006.01)
H05B 3/44 (2006.01)
G05G 9/047 (2006.01)

(52) U.S. Cl.
CPC .............. *G06F 3/038* (2013.01); *A61G 5/10* (2013.01); *H05B 1/0227* (2013.01); *H05B 3/44* (2013.01); *A61G 2203/14* (2013.01); *G05G 9/047* (2013.01); *H05B 2203/022* (2013.01)

(58) Field of Classification Search
CPC ......... G06F 3/038; H05B 3/44; H05B 1/0227; H05B 2203/022; A61G 5/10; A61G 2203/14; G05G 9/047
See application file for complete search history.

(56) References Cited

U.S. PATENT DOCUMENTS

| 5,828,034 | A | * | 10/1998 | Chang ..................... G06F 3/039 |
| | | | | 219/209 |
| 5,850,741 | A | | 12/1998 | Feher |
| 6,126,539 | A | | 10/2000 | Miller et al. |
| 6,135,876 | A | | 10/2000 | Song et al. |
| 6,736,719 | B1 | | 5/2004 | Gehring et al. |
| 6,830,511 | B2 | | 12/2004 | Ghering et al. |
| 6,878,902 | B2 | | 4/2005 | Lyle et al. |
| 2013/0008882 | A1 | | 1/2013 | Hu et al. |
| 2017/0347400 | A1 | | 11/2017 | Krusto |
| 2019/0179427 | A1 | | 6/2019 | Mayer |

* cited by examiner

Primary Examiner — Alexander Eisen
Assistant Examiner — Kebede T Teshome
(74) Attorney, Agent, or Firm — Fish & Richardson P.C.

(57) ABSTRACT

In some implementations, a joystick includes a control unit having a first surface and a handle positioned at an angle adjacent to the first surface. The handle can have a second surface and is operably connected to the control unit. The joystick can further include a heating element, a blower, and one or more vent openings in at least one of the first surface and the second surface. The blower can move air warmed by the heating element through the at least one vent opening.

20 Claims, 10 Drawing Sheets

HEATED JOYSTICK

CROSS-REFERENCE TO RELATED APPLICATIONS

This application is a continuation of U.S. application Ser. No. 16/216,869, filed Dec. 11, 2018, which claims priority to U.S. Application Ser. No. 62/597,402, filed on Dec. 11, 2017. The disclosure of the prior application is considered part of the disclosure of this application, and is incorporated in its entirety into this application.

TECHNICAL FIELD

This document generally describes heated joysticks, and more particularly to heated joysticks for operating machinery, such as wheelchairs.

BACKGROUND

Joysticks are mechanisms that serve as machine/device interfaces that users are able to manipulate in order to operate any of a variety of machines and/or devices, such as vehicles (e.g., wheelchairs, planes), construction equipment (e.g., skid steer), remote controlled devices (e.g., remote control cars, remote control planes), electronic displays (e.g., video game controller, camera controller), and/or other machines/devices. In general, joysticks have included an articulable handle that extends from and is able to pivot relative to a base along one or more axes. For example, joysticks can be unidirectional, bidirectional, or omnidirectional, depending on the arrangement of the hinged connection between the handle and the base. Joysticks include components to translate joystick articulation into one or more control signals (e.g., electronic control signals, direct or indirect mechanical linkage), such as sensors, potentiometers, strain gauges, Joystick operation often requires precision control of the joystick in order to ensure the machine controlled by the joystick operates in the desired manner. However, joystick operators can experience discomfort and limited control or mobility when the hand operating the joystick becomes cold. Hand sweat can also limit control of joysticks.

SUMMARY

This document generally describes heated joysticks—meaning joysticks that include one or more elements for delivering heat to or around an operator's hand, arm, and/or body more generally. For example, heated joysticks can include a joystick handle operably connected to a joystick control unit and to a heating element and/or a blower situated inside a cavity of the control unit, and/or situated in an adjacent external heating unit that is operably connected to the control unit. Heat can be transmitted to an operator's hand, arm, and/or body more generally by warming the air around the operator's hand, arm, and/or body. For example, the control unit and/or the handle can have one or more vent holes that allow passage of warm air directed from the heating element through the vent holes by the blower. The vent holes can be designed and positioned on the control unit and/or handle with any of a variety of configurations (e.g., variety of shapes, sizes, angles, and/or orientations) to direct warm air onto the operator's hand, arm, and/or body more generally.

Heated joysticks as described throughout this document can be used by a variety of operators (e.g., machinery operator, wheelchair operator), in a variety of different conditions (e.g., cold weather, refrigerated warehouse), and in a variety of different contexts (e.g., controller for wheelchair, controller for machinery, controller for vehicle, controller for remote device). For example, a wheelchair operator who is travelling outside during cold weather conditions can use a heated joystick to warm his/her hand so that it does not get cold, which can help the operator maintain sufficient dexterity in his/her hand to continue to effectively control the wheelchair. Heated joysticks can not only help operators in cold environments, but they can also aid operators who suffer from circulatory and/or other disorders that cause the operators' extremities (e.g., hands) to become cold under various conditions (e.g., moderate temperatures, positioning of extremity relative to rest of body for extended period of time). Heated joysticks can help operators warm their extremities during joystick operation, which can help operators continue to maintain a comfortable operating condition and to continue to effectively control the joystick.

A variety of additional and/or alternate features are also possible with heated joysticks. For example, an additional forearm extension unit can direct warm air through vent holes in the forearm extension unit to warm an operator's forearm in addition to warming the operator's hand. The warm air in the forearm extension unit may be provided by the same heating element as is used for the warm air in the joystick, and/or by a separate heating element present in the forearm extension unit. For example, in some cases a mutual blower can direct the warm air through the vent hole in the joystick handle and control unit, as well as the forearm extension unit. In other cases, a separate blower can be provided to direct warm air through vent holes in the forearm extension unit. Heated joysticks can be manufactured by original equipment manufacturers (OEMs), or can be retrofitted to preexisting (non-heated) joysticks. For example, joystick handles with venting can be retrofitted onto joysticks (e.g., replace existing joysticks) and heating units can be retrofitted onto existing joystick control units. Such retrofitting can be provided as kits containing joystick handles and external heating units that can be applied to preexisting (non-heated) control units.

In some implementations, a joystick includes a control unit having a first surface and a handle positioned at an angle adjacent to the first surface. The handle can have a second surface and is operably connected to the control unit. The joystick can further include a heating element, a blower, and one or more vent openings in at least one of the first surface and the second surface. The blower can move air warmed by the heating element through the at least one vent opening.

Certain implementations can optionally include one or more of the following features. The control unit can include a cavity housing at least one control element selected from a shaft, a gimbal, and a circuit board. The joystick can further include an external heating unit positioned adjacent to and operably connected to the control unit. The blower can be located within the external heating unit. The heating element can be located within the external heating unit. The joystick can further include a tube positioned within the cavity and operably connected to the external heating unit. The tube can be operable to direct air flow from the external heating unit through the one or more vent openings. The heating element can be located within the cavity of the control unit. The blower can be located within the cavity of the control unit. The one or more vent openings can be located on the handle. The one or more vent openings can be located on the control unit. The one or more vent openings can be located on the handle and the control unit. At least one of the one or more vent openings can include an aperture in the first surface of the control unit through which the handle or a shaft connecting the handle to the control unit passes. The handle can be selected from a ball knob handle, a t-bar handle, a straight handle, a mushroom head handle, and a u-shaped handle.

The handle can include a distal portion having an elongated cylindrical shape with a distal tapered end and a proximal tapered end; and a proximal portion extending circumferentially from the proximal tapered end of the distal portion, thereby forming a fluted outer surface having a greater radial cross section than the distal portion of the handle. The vent openings can be located on the distal portion of the joystick handle. The vent openings can be located on the fluted proximal portion of the joystick handle. The vent openings can be located on the distal portion of the joystick handle and on the fluted proximal portion of the joystick handle. The vent openings can be positioned circumferentially around a central axis passing from the distal portion to the proximal portion of the joystick handle.

The joystick can further include a shield extending around from the shaft and adjacent to the first surface of the control unit. The shield can be frustoconical and extend circumferentially around the shaft. The shield can be a diaphragm. One or more vent openings can be located on the shield. The joystick can include a forearm extension unit adjacent to the control unit and comprising at least one vent opening. The joystick can include a forearm extension unit adjacent to the external heating unit and comprising at least one vent opening. The blower can be operable to move air through the at least one vent opening of the forearm extension unit. The joystick can further include a second blower operable to move air through the at least one vent opening of the forearm extension unit. The control unit can be operable to connect to a machine and provide information regarding position of the joystick handle to the machine. The machine can be a wheelchair.

In some implementations, a joystick heating unit includes a heating element and a blower. The heating unit can be operable to connect to a joystick control unit and move air out of the joystick control unit through at least one vent opening and toward a joystick handle.

Certain implementations can optionally include one or more of the following features. At least a portion of the heating unit can be operable to be inserted into the joystick control unit. The heating unit can include a connector, a tube, or combinations thereof, operable to be inserted into the joystick control unit and direct air flow from the heating unit through at least a portion of the joystick control unit. The joystick heating unit can further include a forearm heating portion operable to extend away from the joystick control unit when the joystick heating unit is operably connected to the joystick control unit. The forearm heating portion can include one or more vent openings. The forearm heating portion can be operably connected to the heating element. The forearm heating portion can include a second heating element.

In some implementations, a joystick handle includes one or more vent openings.

Certain implementations can optionally include one or more of the following features. The joystick handle can further include a distal portion having an elongated cylindrical shape with a distal tapered end and a proximal tapered end, and a proximal portion extending circumferentially from the proximal tapered end of the distal portion, thereby forming a fluted outer surface having a greater radial cross section than the distal portion of the handle. The one or more vent openings can be located on the distal portion of the joystick handle, the fluted proximal portion of the joystick handle, or a combination thereof.

In some implementations, a kit includes the joystick handles described in any of the preceding paragraphs.

Certain implementations can optionally include one or more of the following features. The kit can further include a joystick control unit wherein the control unit is operable to connect to a machine and provide information regarding position of the joystick handle to the machine.

In some implementations, a method for retrofitting a joystick includes creating a first hole in a joystick control unit, and connecting an external heating unit to the first hole in the joystick control unit.

Certain implementations can optionally include one or more of the following features. The method can further include removing a first joystick handle; and replacing the first joystick handle with a second joystick handle having one or more vent openings therein.

In some implementations, a method for retrofitting a joystick includes creating a second hole in a joystick control unit. and inserting a forearm extension unit into the second hole in the control unit.

Certain implementations of heated joysticks described throughout this document can provide one or more advantages. For example, blowing heated air through vents in the joystick or joystick control unit allows heated air to directly warm parts of the hand needed for joystick control, and aids in drying any sweat on the joystick controlling hand. In contrast to contact-based heating elements that deliver heating to an operator's hand through direct physical contact between a heating element and the operator's hand, which can limit the heat transfer to only the areas of contact, blower-based heated joysticks (as described though out this document) can warm the operator's entire hand, which can increase operator comfort, dexterity, and overall ability to effectively use the joystick.

In another example, targeted warming of the control hand can allow for greater efficiency in using the heating unit and therefore reduced power consumption. Targeted warming also ensure the portions of the controlling hand most needed for precision control maintain mobility. Using targeted warm air as opposed to gloves or shields reduces chance of interference with tactile control, hand sensitivity, hand and joystick visibility, and mobility.

In another example, existing (non-heated) joysticks can be retrofitted with external heating units and joystick handles to add heating to a control unit without having to replace the control unit or the device/machine/vehicle/controller more generally. This can permit operators to add beneficial and advantageous heating without having to purchase a new OEM unit that was originally manufactured with a heated joystick.

In another example, by using blown warmed air to provide heated joysticks, the joysticks dry an operator's hand (creating drying effect) by the warm air blowing through the vent holes and over the operator's hand. Heated joysticks can additionally be manufactured out of materials to absorb moisture from an operator's hand to further aid in drying the operator's hand during operation.

In another example, forearm units can provide targeted warm air to the forearm of the operating arm of the joystick operator, which can increase warmth, comfort, and mobility in the wrist and hand of the operator.

For the terms "for example" and "such as," and grammatical equivalences thereof, the phrase "and without limitation" is understood to follow unless explicitly stated otherwise. As used herein, the term "about" is meant to account for variations due to experimental error. As used herein, the singular forms "a," "an," and "the" are used interchangeably and include plural referents unless the context clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

Other features and advantages will be apparent from the following detailed description and figures, and from the claims.

DETAILED DESCRIPTION

Figure 1A:
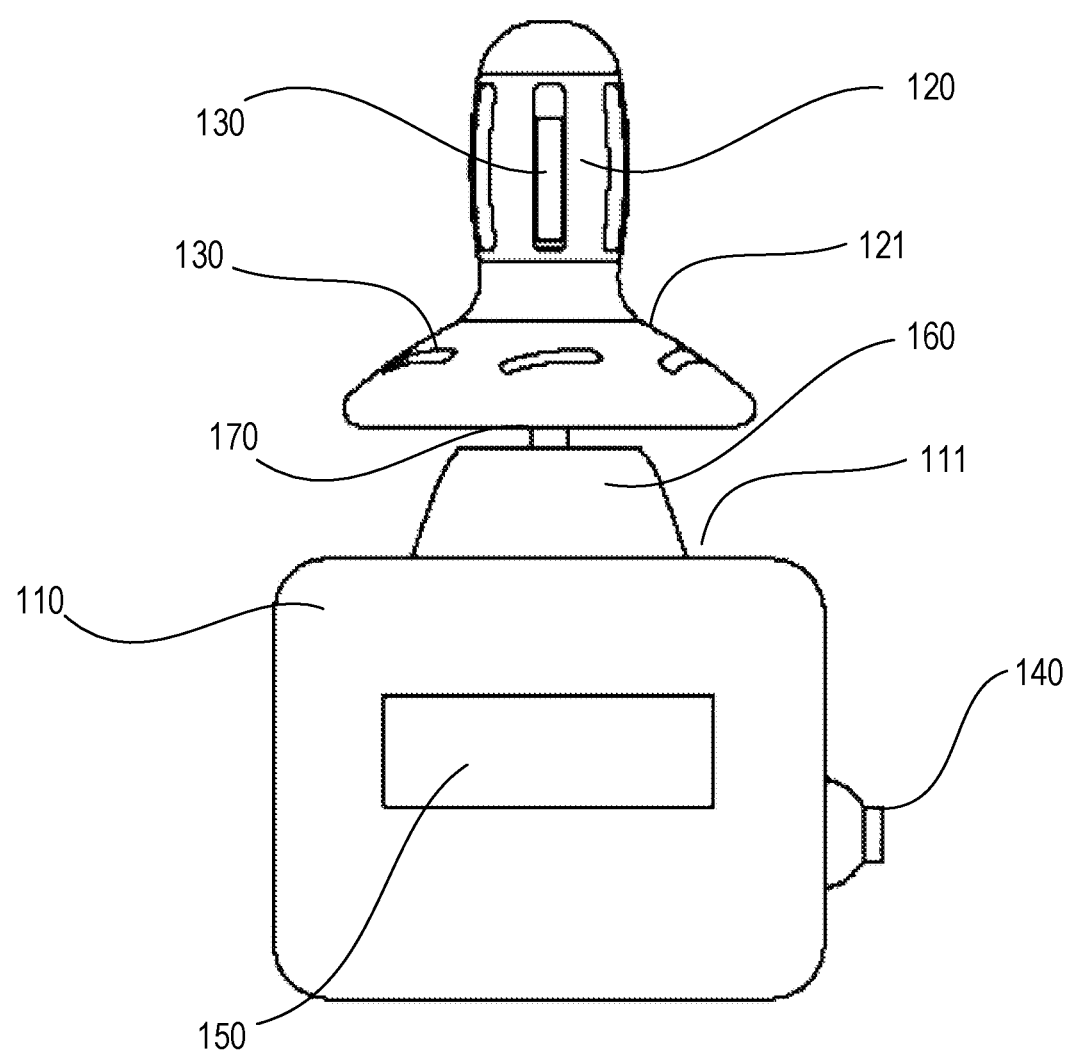
FIG. 1A is a side view of an example heated joystick.
Figure 1B:
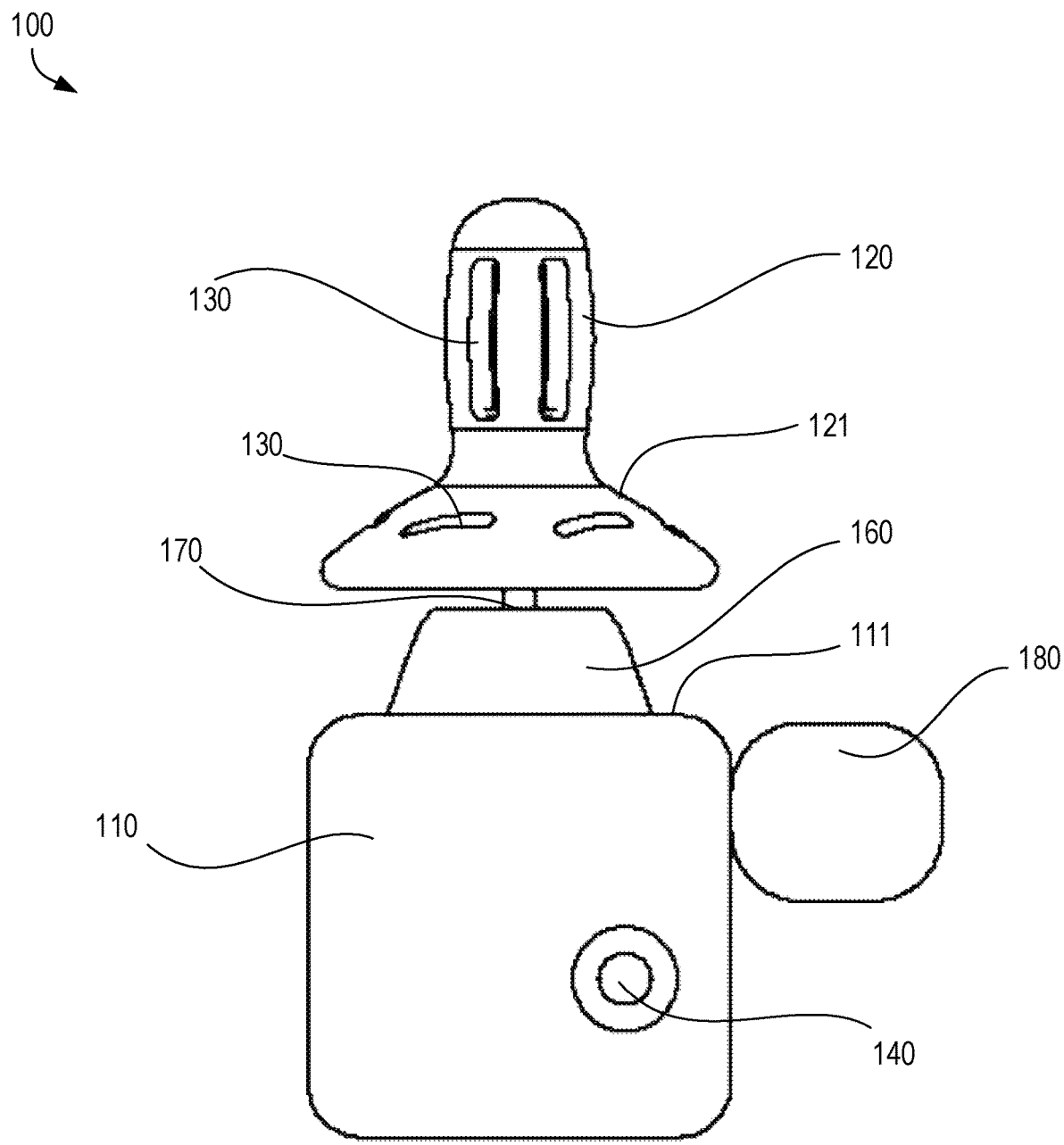
FIG. 1B is a side view of an example heated joystick with an external heating unit.
Figure 1C:
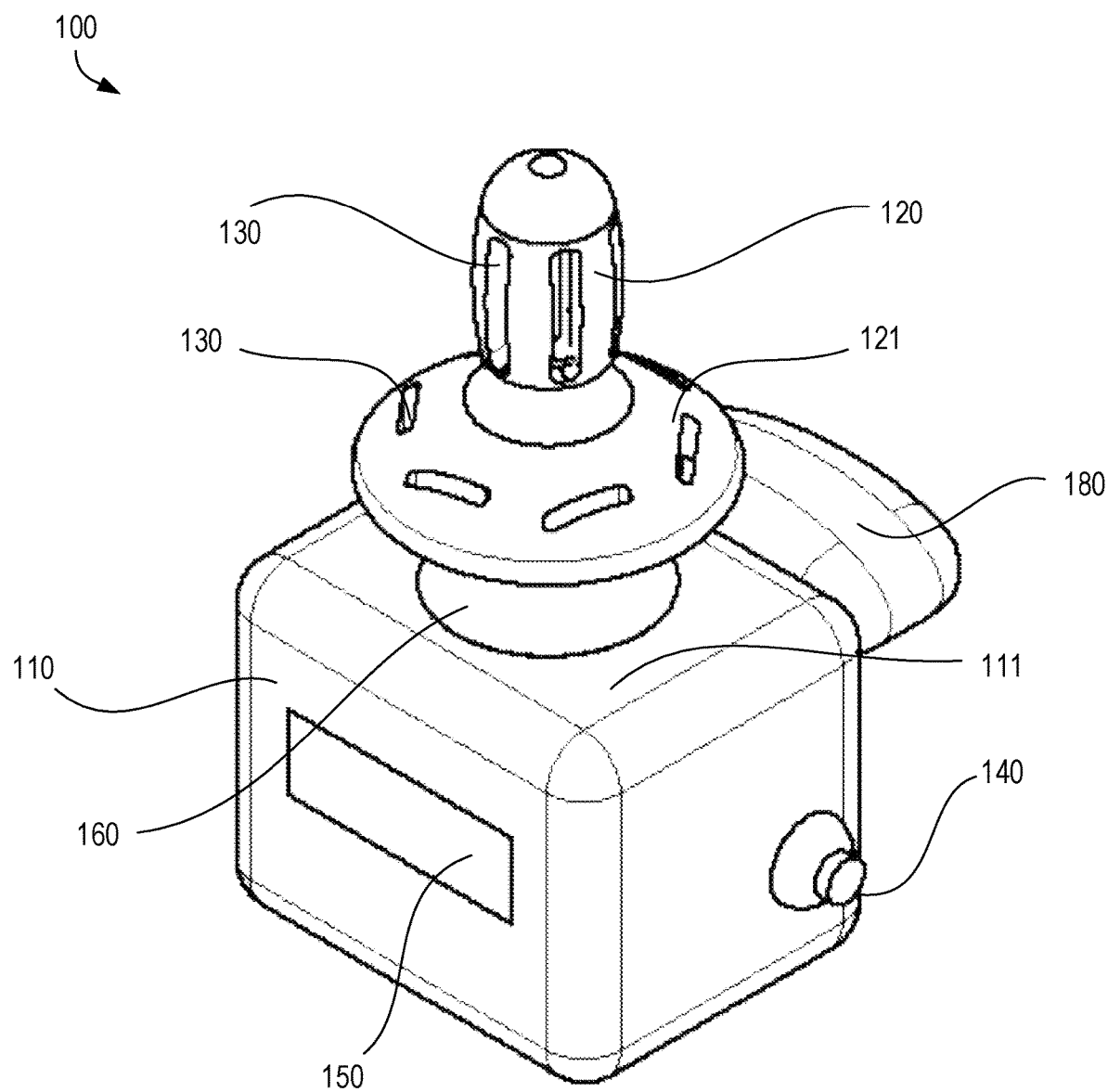
FIG. 1C is a perspective view of an example heated joystick.
Figure 1D:
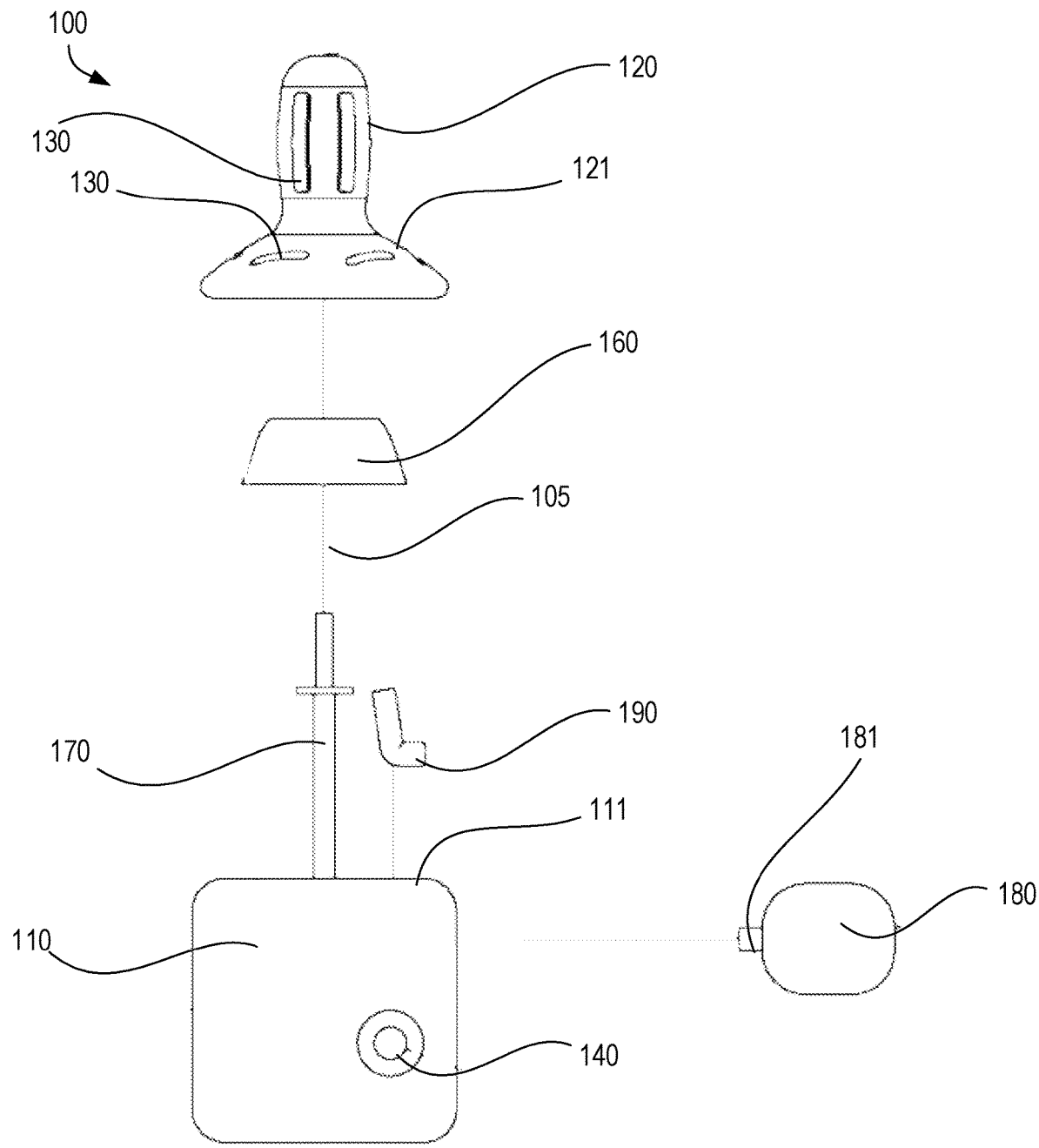
FIG. 1D is an exploded side view of an example heated joystick.
Figure 1E:
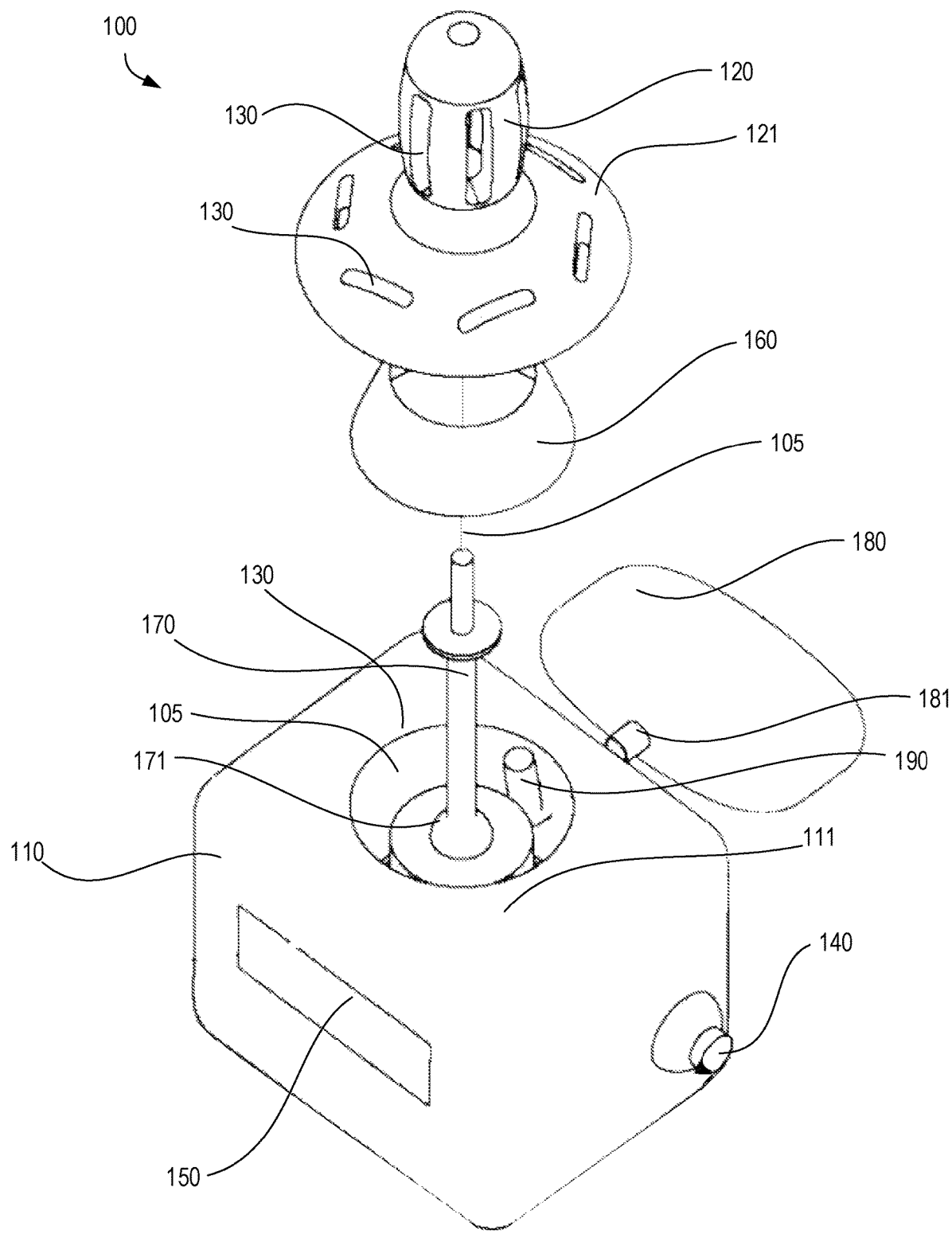
FIG. 1E is an exploded perspective view of an example heated joystick.

The disclosure is generally directed to heated joysticks, joystick heating units, and joystick (or other controller) handles. Heated joysticks can, for example, be useful for operating machinery and/or providing information regarding position of the joystick handle to the machinery. Heated joysticks can be used in a variety of contexts, such as being used to a vehicle (e.g., wheelchair, machinery), video gaming systems, robotic vehicles, construction vehicles, and/or other devices/systems.

FIGS. 1A-1E depict an example joystick 100 that includes an example joystick control unit 110 and an example joystick handle 120 operably connected to the joystick control unit 110. The handle 120 can be connected to the control unit 110, for example, through a shaft 170 that is pivotally mounted to the control unit 110. The shaft 170 can run along a central axis 105, for example.

The control unit can include a switch 140 (or other mechanism) for turning on heating controls to heat the joystick, and/or for turning on a display 150. The switch 140 can be any of a variety of mechanisms to turn/power on one or more features of the joystick 100, such as push buttons, toggles, sensors (e.g., conductive sensors, proximity sensors, touch sensors, motion sensors), voice activated switched (e.g., microphone, speech and audio processor, speech recognition module, command interpretation modeling), and/or other types of switches. The joystick can include a display 150 that can visually output/display information, such as time information, temperature settings for the air and/or heating element that can be adjusted by the user, ambient temperature information (e.g., surrounding air temperature), and/or other parameters or information useful to the joystick operator. The display 150 can include one or more corresponding input mechanisms through which a user can adjust the settings of the joystick 100, such as buttons, dials, keys, sensors, touchscreens, voice interfaces, and/or other user interface features.

The control unit can have a first surface 111, and the handle 120 can be positioned at an angle adjacent to the first surface 111 of the control unit 110. The handle 120 can have a second surface 121. The handle can, in some instances, have a proximal portion 125 and a distal portion 126.

One or more vent openings 130 can be formed in the second surface 121 of the handle 120 on the proximal portion 125 and/or the distal portion 126, the first surface 111 of the control unit 110, and/or combinations thereof. The vent openings 130 can have any of a variety of shapes, sizes, configurations, angles, and/or other characteristics. For example, at least one of the vent openings 130 can be an aperture in the first surface 111 of the control unit 110 through which the handle 120 or a shaft 170 connecting the handle to the control unit 110 passes.

Warm air heated by a heating element (not shown) can be moved by a blower (not shown) through at least one of the vent openings 130, which can warm a user's fingers, hand, and/or arm while the user is operating the joystick 100. The control unit 110 can additionally and/or alternatively be operated with just the blower activated (without the heater turned on), to blow unheated/cool air on the user's hand, which can be used to dry the user's hand off and/or to cool the user. The control unit 110 may additionally and/or alternatively be operated with just the heater activated (without the blower turned on), which may permit conductive elements of the control unit 110 and/or the joystick 100 more generally to radiate heat to the user without blowing air over the user's hand (e.g., user may have dry skin and not want air to be blown in his/her hand to further dry it out). Heating elements and blowers can be contained within the control unit 110 and/or other units that are attached to the control unit.

In some embodiments, an optional shield 160 can extend around the shaft. In some embodiments, the shield is frustoconical and extends circumferentially around the shaft 170. The shield 160 can be positioned adjacent to the first surface 111 of the control unit 110. The shield can, in some embodiments, aid in keeping dust and other unwanted particles out of a cavity 105 within the control unit 110. The optional shield can also, in some embodiments serve to aid in directing warm air heated by the heating element toward the joystick handle 120 and/or toward the operating hand of a joystick operator. In some embodiments, one or more vent openings may be located on the shield. In some embodiments, the shield can be a diaphragm. The cavity can comprise one or more control elements, including a shaft 170, a gimbal 171, and a circuit board (not shown).

The heating element (not shown) can be positioned within a cavity (not shown in FIG. 1A) inside the control unit 110. A blower can additionally and/or alternatively be positioned within the cavity, or in an exterior housing operably connected to the control unit cavity. The blower directs air warmed by the heating element through the one or more vent openings 130. For example, the blower can direct warmed air toward the joystick handle 120 and onto a user's hand controlling/holding the joystick handle 120. In another example, the blower can direct warmed air towards a joystick operator's hand in an area around the handle.

Referring to FIGS. 1B-1E, the heating element and/or blower can be situated in an external heating unit 180 positioned adjacent to and operably connected to the control unit 110. The external heating unit 180 can be inserted into and/or affixed to the joystick control unit 110. The external heating unit 180 can, for example, be connected to the control unit 110 through a connector 181. Air warmed in the external heating unit 180 can pass through the connector 181 into the cavity 105 of the control unit 110. The air warmed in the external heating unit 180 flows through at least a portion of the cavity 105 of the control unit 110 and out of the one or more vent openings 130 toward the joystick handle 120 and the user's hand. In some instances, the warm air from the external heating unit 180 can pass through the connector 181 into a tube 190 inside the cavity 105 of the control unit 110. The tube 190 can be bent, angled, and/or positioned such that it can direct the warm air from the external heating unit 180 through the one or more vent openings 130. The tube 190 allows the warm air to pass through the cavity of the control unit 110 without adversely affecting items within the control unit cavity such as circuit boards or other electronics.

Figure 2A:
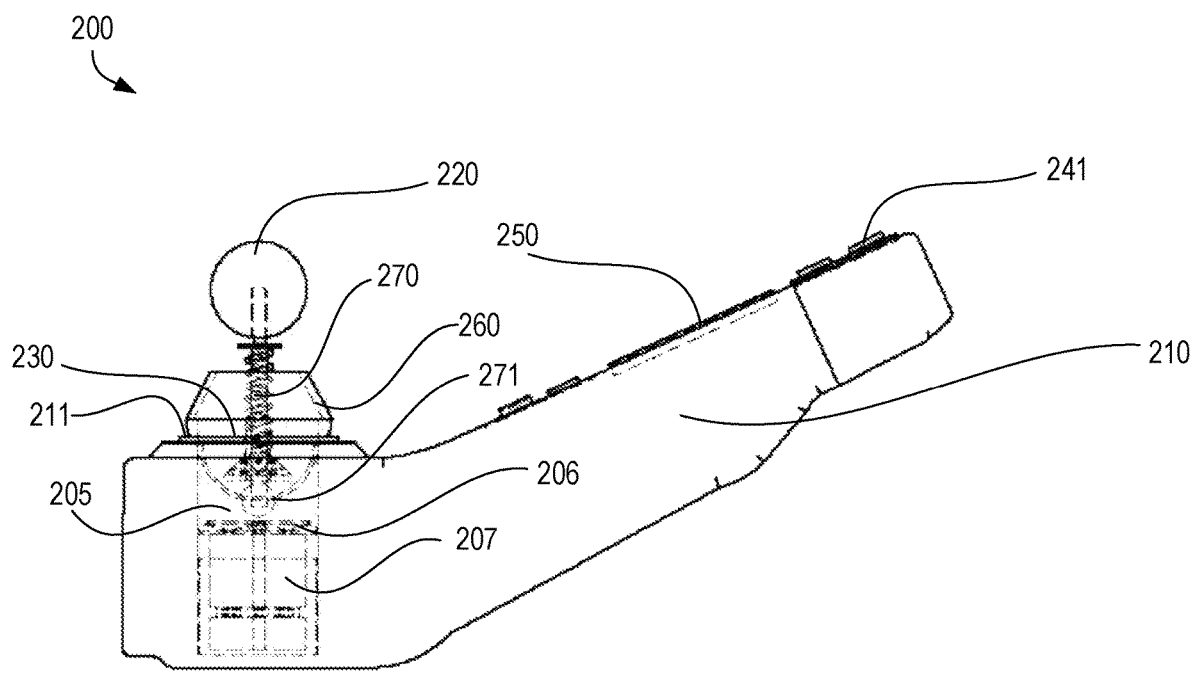
FIG. 2A is a side view of an example heated joystick.
Figure 2B:
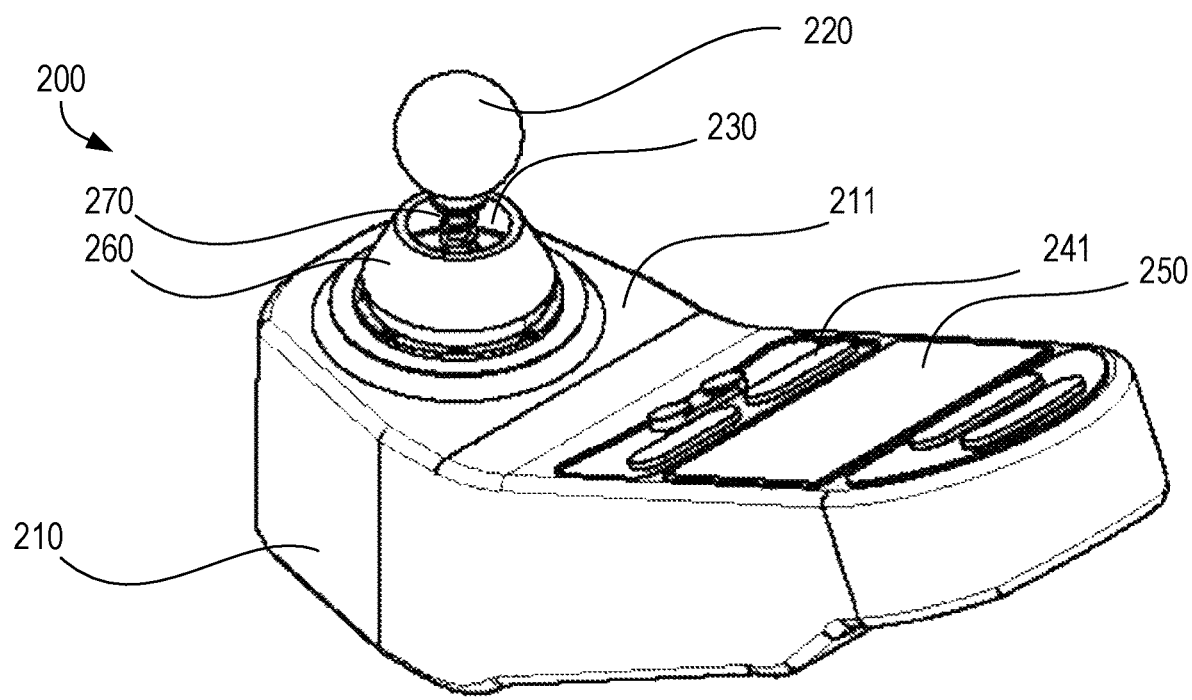
FIG. 2B is a perspective view of an example heated joystick.

In another example shown in FIG. 2A-2B, a joystick 200 includes a heating element 206 and a blower 207 within a cavity 205 in a portion of a joystick control unit 210. The control unit 210 can include one or more displays 250 and one or more buttons 241 for controlling the machine controlled by the joystick, the heating element 206, and/or the blower 207. The blower 207 directs air warmed by heating element 206 through a vent opening 230 in the first surface 211 of the control unit 210. The vent opening 230 is an aperture in the first surface 211 of the control unit 210 through which a shaft 270 connecting the joystick handle 220 to the control unit 210 passes. An optional shield 260 can be positioned adjacent to the first surface 211 of the control unit 210 around the vent opening 230. The shield 260 can extend along the shaft 270 between the handle 220 and the control unit 210, and aid in directing warmed air toward the handle 220. The shield 260 can be asymmetrically shaped and/or independently rotatable such that the shield 260 can be rotated to direct warmed air toward a specific location near the joystick or joystick handle 220 as desired by a joystick operator.

Figure 3A:
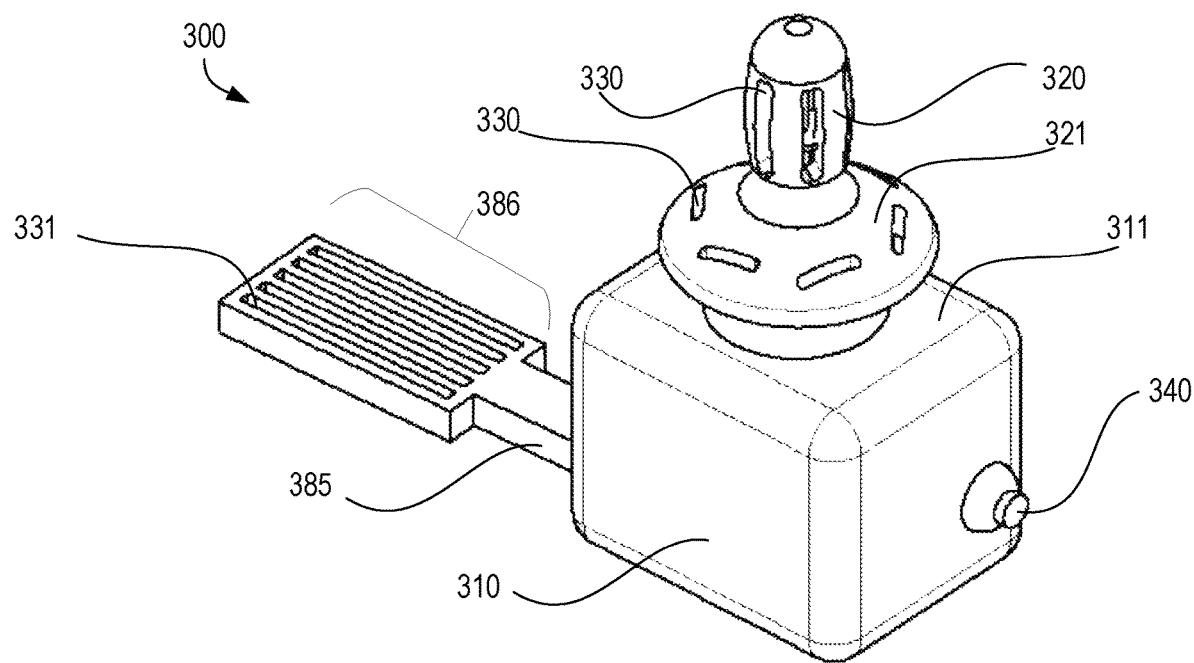
FIG. 3A is a perspective view of an example heated joystick with a forearm extension unit.
Figure 3B:
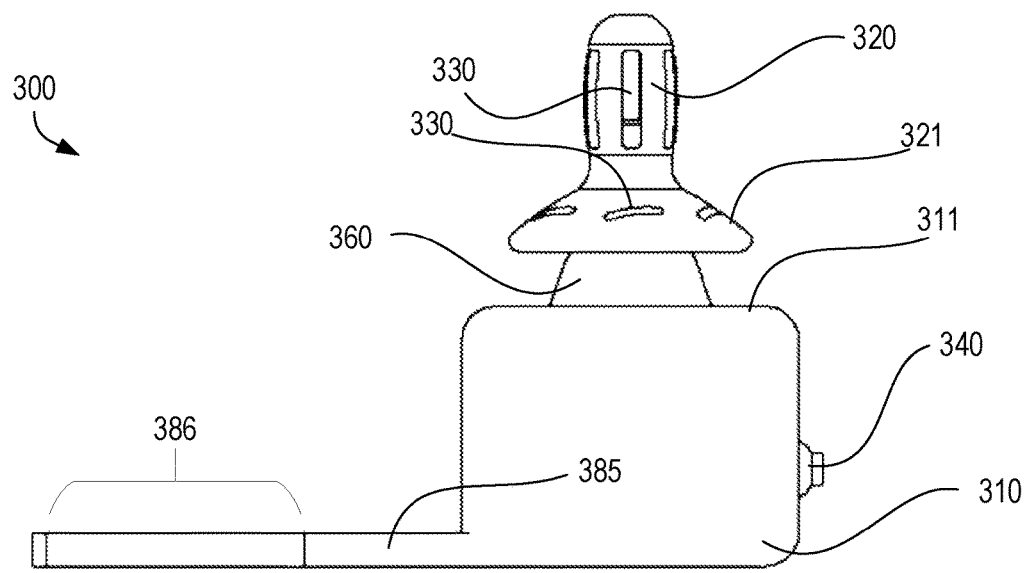
FIG. 3B is a side view of an example heated joystick.

Referring to FIGS. 3A-B, a joystick 300 can include a forearm extension unit 385 for providing warm air to the forearm of a joystick operator. The forearm extension unit 385 can be positioned adjacent to the control unit 310 and/or to an external heating unit that is adjacent to the control unit 310. The forearm extension unit 385 can have a forearm heating portion 386 that includes one or more vent openings 331 and is operable to extend away from the control unit 310 when the forearm extension unit 385 is operably connected to the control unit 310. Air warmed by a common heating element can be directed by a common blower through the one or more forearm extension unit vent openings 331 and the one or more vent openings 330 located on the first surface 311 of the control unit 310 and/or the second surface 321 of the joystick handle 320. In some embodiments, a first blower operates to move warmed air through the vent openings 330 of the joystick handle or control unit, while a second blower operates to move warmed air through the vent openings 331 of the forearm extension unit, which may use the same or different heating elements. A common heating element can warm air that will eventually passes through both the vent openings 330 and 331. In some embodiments, a first heating element warms air that will eventually pass through vent openings 330, while a second heating element warms air that will eventually pass through vent openings 331. In some embodiments, the forearm extension unit 385 includes its own onboard heating element and/or blower that is separate from the heating element and blower that warms air and directs warm air through the joystick control unit 310 toward the joystick handle 320.

Figure 3C:
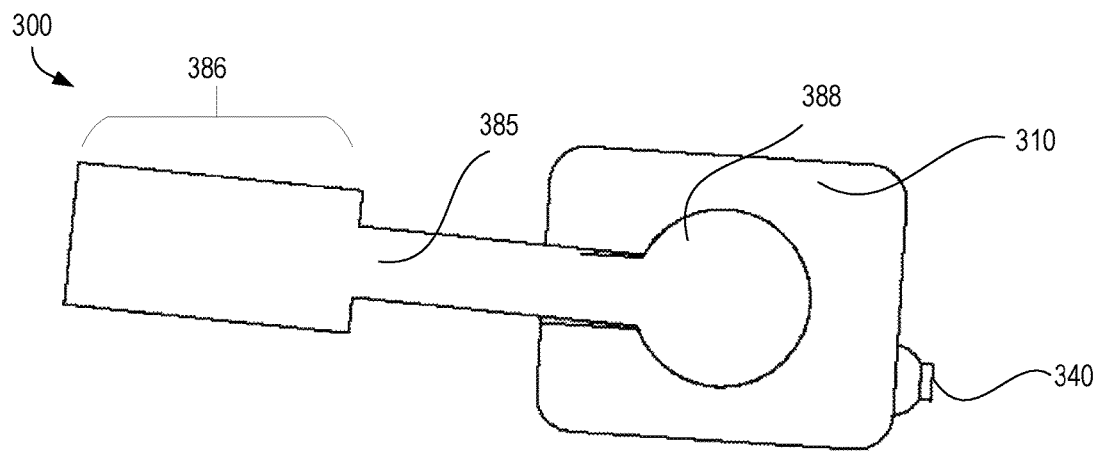
FIG. 3C is a bottom view of an example heated joystick.
Figure 3D:
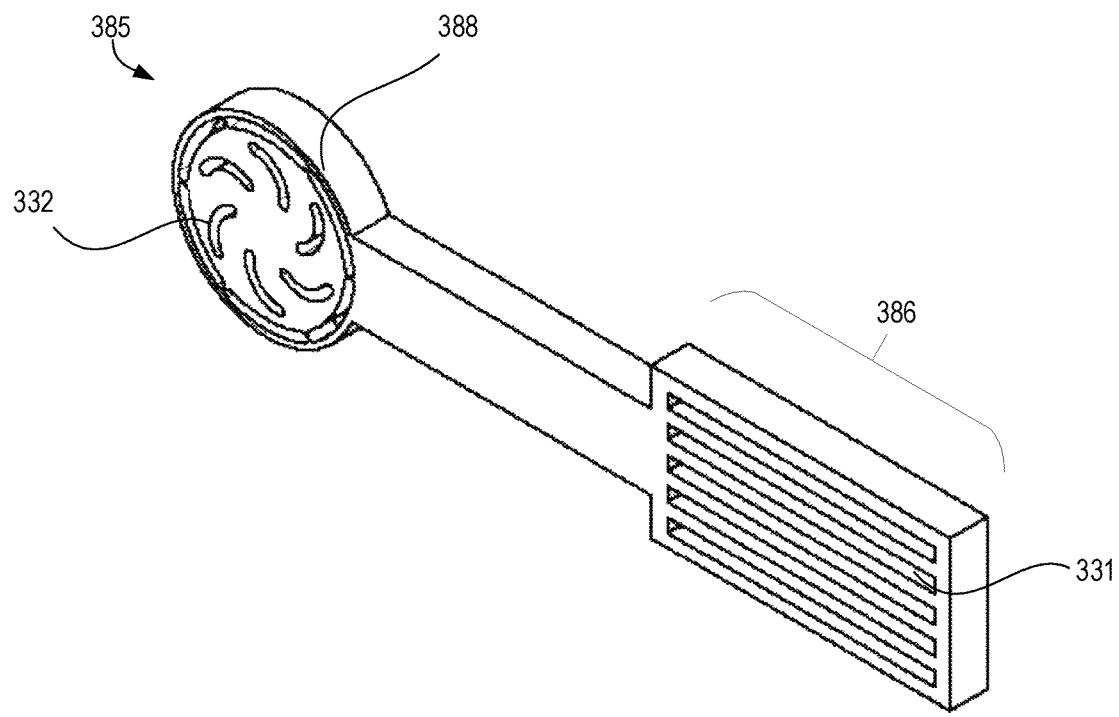
FIG. 3D is a perspective view of an example forearm extension unit.

Referring to FIGS. 3C-3D, the forearm extension unit 385 can be an optional independent unit that can be attached to or removed from the joystick control unit 310 or, in other embodiments, the external heating unit. As shown in FIG. 3D, an independent forearm extension unit 385 can house a common heating element and common blower that warms air and directs the warm air through both the vent openings 331 on the forearm extension unit 385, as well as through connecting vent openings 332 on a connecting portion 388 of the forearm extension unit 385. The connecting portion 388 can operably connect or plug into a joystick control unit 310, as in FIG. 3C, and the air warmed by the common heating element within forearm extension unit 385 can flow through vent openings 332 on the connecting portion 388 and into the cavity of the control unit 310, then further through vent openings 330 on the first surface 311 of the control unit, and/or on the second surface of the joystick handle 320.

Figure 4A:
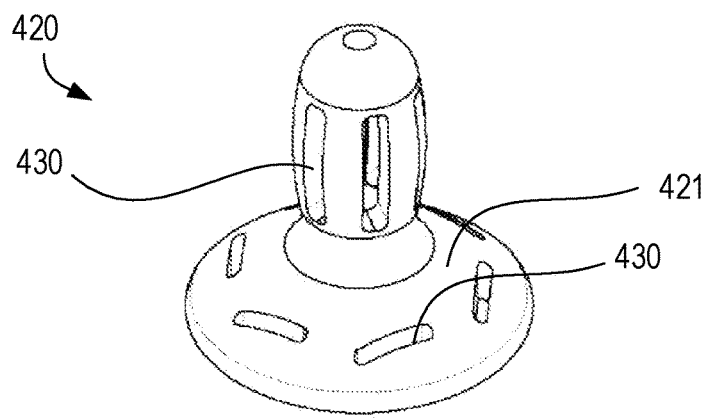
FIG. 4A is a perspective view of an example joystick handle.
Figure 4B:
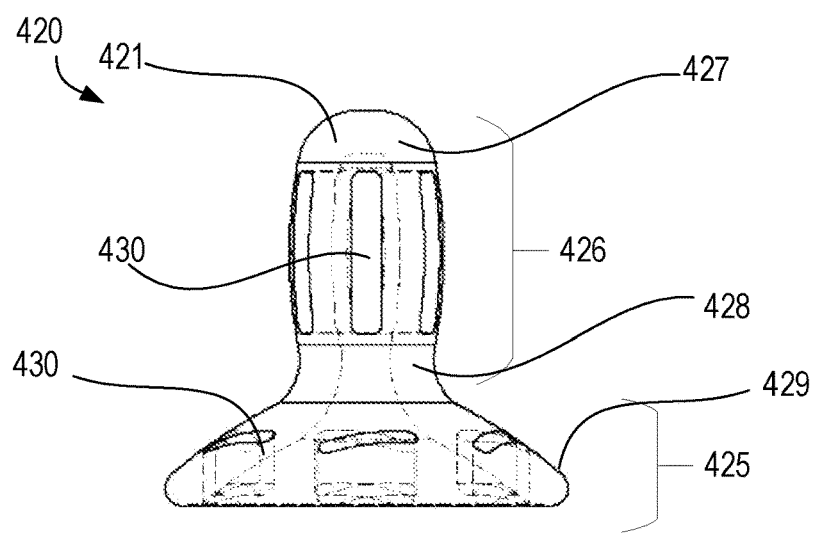
FIG. 4B is a side view of an example joystick handle.
Figure 4C:
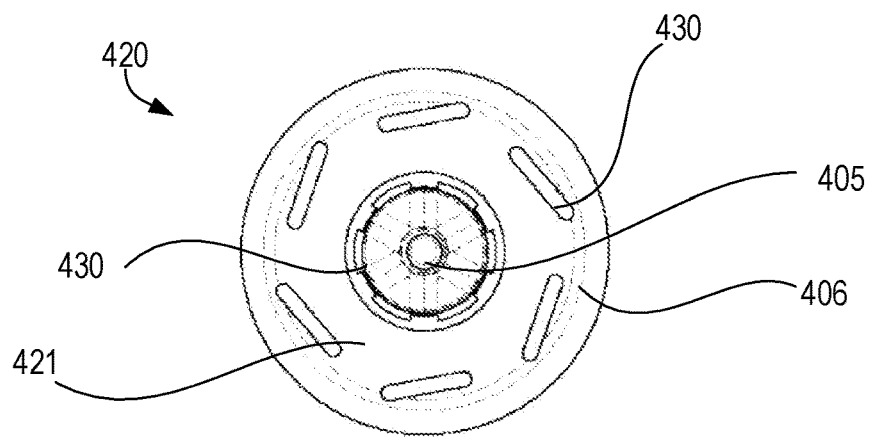
FIG. 4C is a top view of an example joystick handle.

Referring to FIG. 4A-4C, a joystick handle 420 including one on more vent openings 430 that can direct air projected to a base of the joystick handle (e.g., from a control unit) to a user's hand. The handle can be any shape of joystick handle, such as, for example, a ball knob handle, a t-bar handle, a straight handle, a mushroom head handle, or a u-shaped handle. The second surface 421 of the handle 420 can be made of materials that provide grip and or absorbency to absorb sweat or other fluids. In some embodiments, the second surface 421 of the handle 420 is made of silicone, rubber, or other appropriate materials. In some embodiments, the handle can have a distal portion 426 having an elongated cylindrical shape with a distal tapered end 427 and a proximal tapered end 428. The handle has a proximal portion extending circumferentially from the proximal tapered end 428 of the distal portion 426 around a central axis 405, the central axis 405 passing from the distal portion 426 to the proximal portion 425. The proximal portion 425 forms a fluted outer surface 429 having a greater radial cross section than the distal portion 426 of the handle 420.

One or more vent openings 430 are located on the distal portion 426 of the joystick handle 420 to direct air received at the base of the handle 420 through the body of the handle 420 and out to the user's hand (gripping or near the handle 420). The one or more vent openings 430 can be located on the fluted proximal portion 425 of the joystick handle 420. In some embodiments, vent openings are located on the distal portion 426 and on the fluted proximal portion 425 of the joystick handle 420. In some embodiments, the vent openings 430 are positioned circumferentially around a central axis 405, the central axis 405 passing from the distal portion 426 to the proximal portion 425 of the joystick handle 420. The vent openings 430 can be positioned, for example, orthogonal to an imaginary circle 406 having the central axis 405 as circle's center. Vent openings can be specifically configured and tailored, with different sizes, shapes, configurations, and angles, to provide different distributions of air through the handle 420 and onto the user's hand. For example, a user may select from among multiple different handles 420 each having different vent opening 430 configurations to select an air distribution that is best suited for the particular user. Various vent openings, such as orthogonal vent openings, can provide particular focusing of the warmed air onto the hand of an operator that is operating the joystick, which can improve the distribution of blown and/or heated air onto the user's hand.

Kits can be provided to retrofit existing joysticks (that do not have heating and blower capabilities) with the heating capabilities described throughout this document. For example, retrofitting kits can include an external heating unit and/or a forearm adapter that can be added to an existing control unit, and/or a joystick handle with vent openings to distribute air to the user's hand. In some embodiments, a kit can include a joystick handle having one or more vent openings as described herein and/or an external heating unit as described herein. In some embodiments, a kit can include a forearm extension unit as described herein. In some embodiments, methods for retrofitting a joystick with an external heating unit are provided herein. In some embodiments, a method for retrofitting a joystick includes creating a first hole in the joystick control unit and connecting an external heating unit to the first hole in the joystick control unit. In some embodiments, connecting an external heating unit includes inserting a tube connected to the external heating unit into the first hole in the control unit. In some embodiments, retrofitting a joystick includes removing a first joystick handle and replacing the first joystick handle with a second joystick handle having one or more vent openings therein, such as the joystick handles described herein. In some embodiments, retrofitting a joystick includes creating a second hole in a joystick control unit and inserting a forearm extension unit into the second hole in the control unit.

The foregoing description is intended to illustrate example implementations, which may be modified in any of a variety of ways, including adding, removing, and modifying features that are described. Furthermore, features from different implementations can be combined and adapted in any possible combinations and/or sub-combinations. Other aspects, advantages, and modifications are within the scope of the following claims.

What is claimed is:

1. A joystick comprising:
a control unit having a first surface defining, at least, a cavity housing having at least one control element to control operation of an associated machine or device;
a blower adjacent to the control unit and configured to generate a flow of air that flows into the cavity of the control unit, wherein the flow of air generated by the blower emanates out of an opening of the blower and into the cavity of the control unit;
a handle positioned at an angle adjacent to the first surface of the control unit, wherein the handle has a second surface that defines one or more vent openings that direct the flow of air received at a base of the handle from the blower through the handle and out through the one or more vent openings on the second surface of the handle, wherein the handle is operably connected to the control element in the control unit; and
a user input device configured to receive user input to control operation of the blower and the flow of air generated therefrom.

2. The joystick of claim 1, further comprising a heating element configured to warm air in and around the heating element when actuated.

3. The joystick of claim 2, wherein the blower is positioned adjacent the heating element to generate a flow of warm air when both the heating element and the blower are actuated.

4. The joystick of claim 3, wherein the blower and the heating element are selectively actuated using the user input device.

5. The joystick of claim 1, wherein the user input device includes a graphical user interface (GUI) display that is configured to output time information, temperature settings for the blower, selectable options to adjust the temperature settings for the blower, and ambient temperature information.

6. The joystick of claim 1, further comprising a rotatable shield positioned adjacent to the first surface of the control unit around the at least one vent openings, wherein the rotatable shield is configured to at least partially retain air within a space from an external environment, and wherein the rotatable shield is independently rotatable to at least partially retain the air within the space that is desired by an operator of the associated machine or device.

7. The joystick of claim 6, wherein the rotatable shield extends along a shaft between the handle and the control unit.

8. The joystick of claim 6, wherein the rotatable shield is asymmetrically shaped.

9. The joystick of claim 1, further comprising an external heating unit positioned adjacent to and operably connected to the control unit, wherein the blower is located within the external heating unit.

10. A kit for retrofitting a joystick to include heating features to warm a user's hand, the kit comprising:
a joystick handle configured to replace an existing joystick handle for a machine or device, the joystick handle being configured to be attached at an angle adjacent to a first surface of a control unit for the machine or device, wherein the joystick handle is operably connected to a control element in the control unit, wherein the joystick handle includes (i) a second surface that defines one or more vent openings extending through a body of the joystick handle to direct a flow of air emanating from a joystick opening in the control unit through the body of the joystick handle and out through the one or more vent openings on the second surface of the joystick handle (ii) and a user input device; and
an external joystick blower unit that is configured to be fluidly connected to the control unit, the external joystick blower unit including a blower configured to generate a flow of air and an outlet configured to be fluidly connected to an aperture in the control unit through which the flow of air from the blower is introduced into a cavity in the control unit, wherein the flow of air is directed from the cavity through the joystick opening in the control unit and out through the one or more vent openings on the second surface of the joystick handle via an air channel provided by the aperture in the control unit, the cavity, and the joystick opening, wherein operation of the blower and the flow of air generated therefrom are controlled by a user at the user input device.

11. The kit of claim 10, wherein the external joystick blower unit further includes a heating element configured to warm air in and around the heating element when actuated.

12. The kit of claim 11, wherein the blower is positioned adjacent the heating element to generate a flow of warm air when both the heating element and the blower are actuated.

13. The kit of claim 12, wherein the blower and the heating element are selectively actuated using the user input device.

14. The kit of claim 10, wherein the user input device includes a graphical user interface (GUI) display that is configured to output time information, temperature settings for the external joystick blower unit, selectable options to adjust the temperature settings for the external joystick blower unit, and ambient temperature information.

15. The kit of claim 10, wherein the joystick handle further includes a rotatable shield positioned adjacent to the first surface of the control unit around the one or more vent openings, wherein the rotatable shield is configured to at least partially retain air within a space from an external environment, and wherein the rotatable shield is independently rotatable to at least partially retain the air within the space that is desired by a user of the machine or device.

16. The kit of claim 15, wherein the rotatable shield extends along a shaft between the joystick handle and the control unit.

17. The kit of claim 15, wherein the rotatable shield is asymmetrically shaped.

18. The kit of claim 10, wherein the external joystick blower unit further includes an external power source configured to provide power to the blower.

19. The kit of claim 10, further comprising a forearm extension unit positioned adjacent to the control unit and the external joystick blower unit, wherein the forearm extension unit includes a surface defining one or more vent openings extending through a body of the forearm extension unit to channel the flow of air emanating from the joystick opening in the control unit through the one or more vent openings of the forearm extension unit to warm the user's forearm.

20. The kit of claim 19, wherein the blower is selectively actuated, using the user input device, to transmit the flow of air through the one or more vent openings extending through the body of the forearm extension unit.

* * * * *